US012659551B2

(12) United States Patent
Gibbs

(10) Patent No.: US 12,659,551 B2
(45) Date of Patent: *Jun. 16, 2026

(54) ADAPTIVE VOLUME CONTROL FOR MEDIA OUTPUT DEVICES AND SYSTEMS

(71) Applicant: DISH Network L.L.C., Englewood, CO (US)

(72) Inventor: Peter Gibbs, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/660,821

(22) Filed: May 10, 2024

(65) Prior Publication Data

US 2024/0292064 A1 Aug. 29, 2024

Related U.S. Application Data

(63) Continuation of application No. 17/583,589, filed on Jan. 25, 2022, now Pat. No. 12,010,392.

(51) Int. Cl.
| | |
|---|---|
| *H04N 21/485* | (2011.01) |
| *H04N 21/439* | (2011.01) |
| *H04N 21/442* | (2011.01) |
| *H04N 21/466* | (2011.01) |
| *H04R 3/04* | (2006.01) |

(52) U.S. Cl.
CPC ..... *H04N 21/4852* (2013.01); *H04N 21/4394* (2013.01); *H04N 21/44213* (2013.01); *H04N 21/4666* (2013.01); *H04R 3/04* (2013.01); *H04R 2430/01* (2013.01)

(58) Field of Classification Search
CPC ........ H04H 60/46; H04H 60/33; G06F 3/165; G06F 3/16; G06F 16/68
USPC ............................ 381/104, 107, 108; 700/94
See application file for complete search history.

(56) References Cited

U.S. PATENT DOCUMENTS

| | | | | |
|---|---|---|---|---|
| 10,241,747 | B2 * | 3/2019 | Bostick | G06F 3/165 |
| 10,812,903 | B2 * | 10/2020 | Wilson | H04R 3/00 |
| 11,328,218 | B1 * | 5/2022 | Aradhye | G06N 20/00 |
| 11,475,277 | B2 * | 10/2022 | Elsayed | G06F 18/285 |
| 2007/0019113 | A1 * | 1/2007 | Van Sinderen | H03D 7/14 |
| | | | | 348/648 |
| 2008/0130958 | A1 * | 6/2008 | Ziomek | H03G 3/3005 |
| | | | | 382/116 |
| 2010/0008526 | A1 * | 1/2010 | De Vries | H04R 25/70 |
| | | | | 381/314 |
| 2013/0094656 | A1 * | 4/2013 | Fung | H03G 3/32 |
| | | | | 901/47 |

(Continued)

*Primary Examiner* — Alexander Krzystan
(74) *Attorney, Agent, or Firm* — Kilpatrick Townsend & Stockton LLP

(57) ABSTRACT

Various arrangements for performing dynamic volume control are provided. Audio characteristics of audio content being output to a user may be identified. Adjustments made to an audio volume setting by the user while the audio content is being output to the user can be monitored. A machine learning model can be trained based on the adjustments made to the audio volume setting by the user that are mapped with the audio characteristics of the audio content. After the machine learning model is trained, the audio volume setting can be adjusted based at least in part on the trained machine learning model analyzing audio content.

20 Claims, 5 Drawing Sheets

(56) References Cited

U.S. PATENT DOCUMENTS

| | | | |
|---|---|---|---|
| 2013/0243227 A1* | 9/2013 | Kinsbergen ......... | H04M 1/6016 |
| | | | 381/314 |
| 2020/0327378 A1* | 10/2020 | Smith .................... | G06N 5/048 |
| 2021/0250645 A1* | 8/2021 | Richman ............ | H04N 21/4435 |
| 2023/0260531 A1* | 8/2023 | Srivastava ............ | G10L 21/028 |
| | | | 704/233 |

* cited by examiner

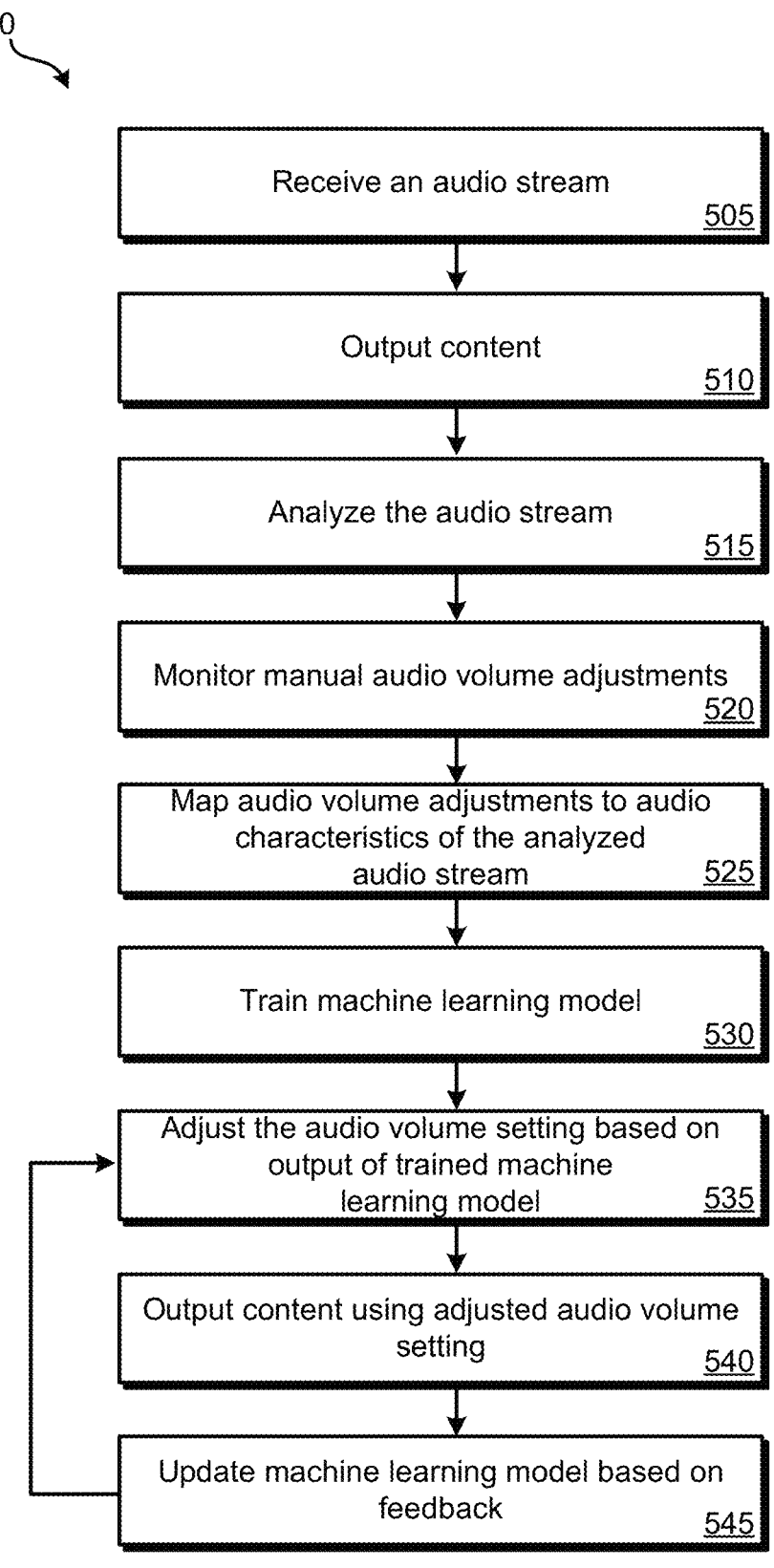

500

Receive an audio stream
505

Output content
510

Analyze the audio stream
515

Monitor manual audio volume adjustments
520

Map audio volume adjustments to audio characteristics of the analyzed audio stream
525

Train machine learning model
530

Adjust the audio volume setting based on output of trained machine learning model
535

Output content using adjusted audio volume setting
540

Update machine learning model based on feedback
545

FIG. 5

ADAPTIVE VOLUME CONTROL FOR MEDIA OUTPUT DEVICES AND SYSTEMS

CROSS REFERENCE TO RELATED APPLICATIONS

This application is a continuation of U.S. Non-Provisional patent application Ser. No. 17/583,589, filed on Jan. 25, 2022, which is incorporated by reference for all purposes.

BACKGROUND

Having the remote control handy to adjust the audio volume is commonplace for many content listeners. For instance, during a movie, a viewer may turn the volume up to be able to hear dialogue but later may be annoyed by loud sound effects or music and may turn the volume back down. Such repeated audio volume adjustment is annoying to perform and can disrupt the listener's enjoyment of the media.

SUMMARY

Various methods for performing dynamic volume control are detailed herein. The methods can include receiving, by a media output device, content comprising audio content. The methods can include outputting, by the media output device to a user, the audio content. The methods can include analyzing, by the media output device, audio characteristics of the content being output to the user. The methods can include monitoring, by the media output device, adjustments made to an audio volume setting by the user while the audio content is being output to the user. The methods can include mapping, by the media output device, the adjustments made to the audio volume setting by the user with the audio characteristics of the audio content. The methods can include training, by the media output device, a machine learning model based on the adjustments made to the audio volume setting by the user that are mapped with the audio characteristics of the audio content. The methods can include adjusting, by the media output device, the audio volume setting based at least in part on the trained machine learning model analyzing the audio content. The methods can include outputting, by the media output device, content using the adjusted audio volume setting.

Embodiments of such methods can include one or more of the following features: The machine learning model may classify the audio content into an audio class of a plurality of audio classes and adjusts the audio volume setting based on the audio class into which the audio content is classified. The machine learning model may be a neural network. The methods can include outputting, by the media output device to the user, video content, wherein the content comprises the video content. The methods can include analyzing, by the media output device, video characteristics of the video content being output to the user. The methods can include training, by the media output device, the machine learning model based on the video characteristics. The audio volume setting can be adjusted relatively based on a previous audio volume setting. The media output device may be a television receiver comprising a plurality of tuners that are configured to receive broadcast television channels. Outputting the audio content using the adjusted audio volume setting can involve outputting the audio content via one or more audio speakers. Outputting the audio content using the adjusted audio volume setting can involve outputting the audio content to a separate audio output device for output. Analyzing audio characteristics of the audio content can include creating an acoustic fingerprint for a chunk of the audio content, whereby a plurality of acoustic fingerprints are created for a plurality of chunks of the audio content.

In some embodiments, a media output device is presented. The device can include an interface through which media comprising audio content is received. The device can include an audio output component through which the audio content is output to a user. The device can include a processing system, comprising one or more processors. The processing system can be configured to analyze audio characteristics of the audio content being output to the user. The processing system can be configured to monitor adjustments made to an audio volume setting by the user while the audio content is being output to the user. The processing system can be configured to map the adjustments made to the audio volume setting by the user with the audio characteristics of the audio content. The processing system can be configured to train a machine learning model based on the adjustments made to the audio volume setting by the user that are mapped with the audio characteristics of the audio content. The processing system can be configured to adjust the audio volume setting based at least in part on the trained machine learning model analyzing the audio content after the machine learning model is trained. The processing system can be configured to output the audio content using the adjusted audio volume setting via the audio output component.

Embodiments of such media output devices can include one or more of the following features: The machine learning model can classify the audio content into an audio class of a plurality of audio classes and adjusts the audio volume setting based on the audio class into which the audio content is classified. The machine learning model can be a neural network. The device can include a user interface. The processing system can be configured to adjust the audio volume setting relatively based on a previous manual audio volume setting received from the user via the user interface. The device can include one or more tuners configured to receive broadcast television via a television service provider network, wherein the media output device is a television receiver. The audio output component can be a speaker. The audio output component can be an audio output interface that outputs the audio content to a speaker separate from the media output device. The processing system being configured to analyze the audio characteristics of the audio content can include the processing system being configured to: analyze a chunk of the audio content to create a plurality of sets of audio data, whereby a plurality of sets of audio data are created. The media output device can include an electronic display on which video content of the media output. The device can also include a non-transitory processor readable medium that stores a volume model datastore. The volume model datastore can store multiple trained machine learning models that are each used to dynamically control the audio volume setting.

In some embodiments, a non-transitory processor-readable medium comprising processor-readable instructions are provided. The instructions can cause one or more processors to receive content comprising audio content. The instructions can cause the one or more processors to cause the audio content to be output. The instructions can cause the one or more processors to analyze audio characteristics of the audio content being output. The instructions can cause the one or more processors to monitor adjustments made to an audio volume setting by a user while the audio content is being output to the user. The instructions can cause the one or more processors to map the adjustments made to the audio volume setting by the user with the audio characteristics of the audio content. The instructions can cause the one or more processors to train a machine learning model based on the adjustments made to the audio volume setting by the user that are mapped with the audio characteristics of the audio content. The instructions can cause the one or more processors to adjust the audio volume setting based at least in part on the trained machine learning model analyzing the audio content after the machine learning model is trained. The instructions can cause the one or more processors to cause the audio content to be output using the adjusted audio volume setting via an audio output component.

BRIEF DESCRIPTION OF THE DRAWINGS

FIG. 5 illustrates an embodiment of a method for performing dynamic volume control.

DETAILED DESCRIPTION

In order to provide a content listener or viewer (collectively referred to as a "user") with a better listening or viewing experience, a locally-executed machine learning (ML) model can be trained and executed to adjust the audio volume of content, such as stand-alone audio (e.g., music, podcasts, broadcast radio) or audio accompanying video content (e.g., movies, sporting events, streaming video content, broadcast television, streaming television, etc.).

For a time, adjustments made to an audio volume setting ("volume") may be monitored and mapped to characteristics of audio that has recently been output. An ML model can be trained to adjust the volume without user input to mimic adjustments that the user would be expected to make in view of the currently-output audio. Accordingly, a trained ML model used to dynamically adjust the volume of a media output device may significantly decrease the frequency at which a user needs to manually adjust the volume in order to match the user's desired listening preferences.

Figure 1:
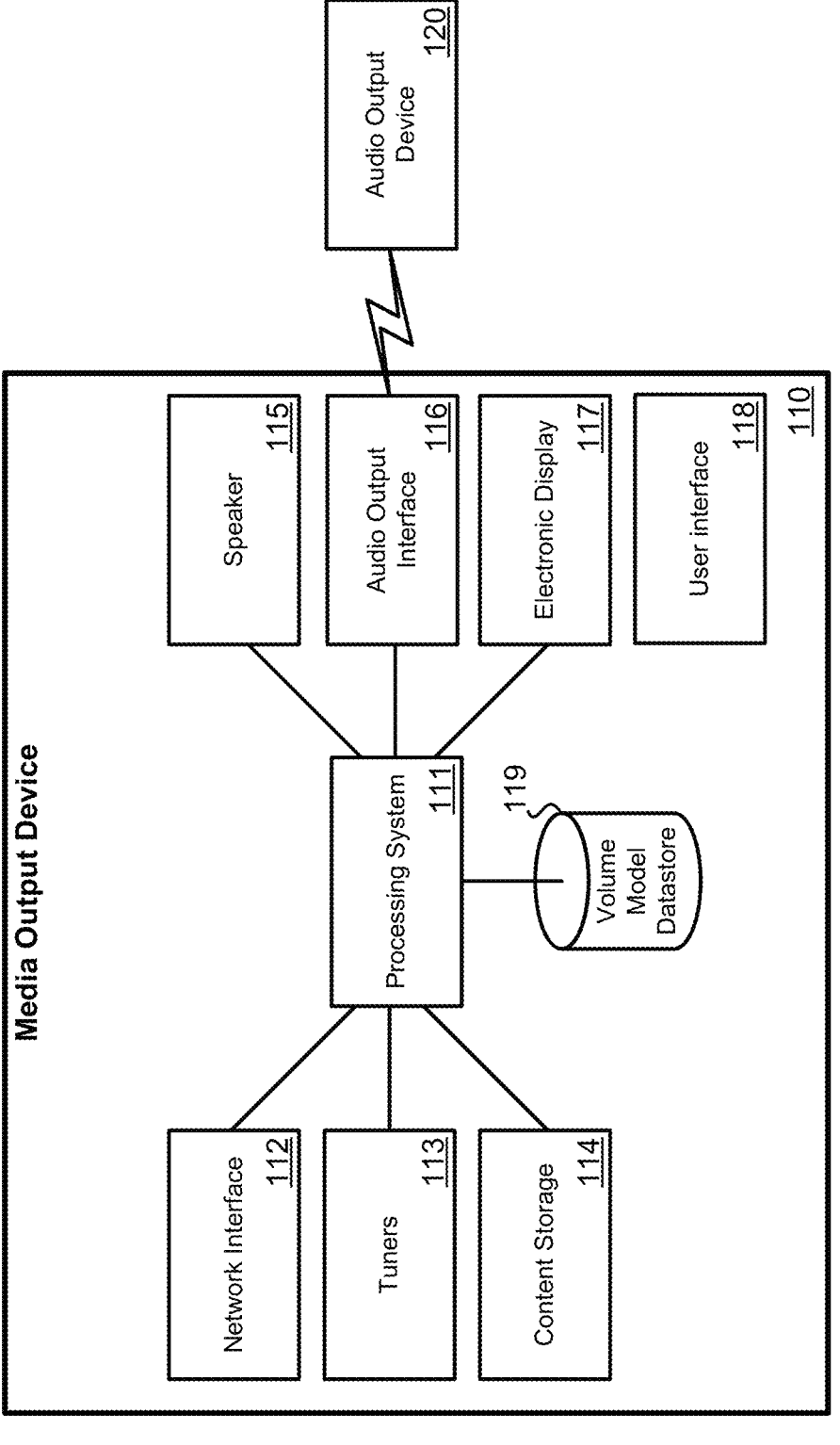
FIG. 1 illustrates an embodiment of media output system that can perform dynamic volume control.

Further detail regarding such embodiments and other embodiments is provided in relation to the figures. FIG. 1 illustrates an embodiment of media output system 100 that can perform dynamic volume control. At a high level, media output system 100 includes a media output device 110 and, possibly, a separate audio output device 120. Some forms of media output device 110 can directly output media, such as a smartphone, gaming device, tablet computer, smart television, and laptop computers, while other forms of media output device 110 can output media indirectly via other devices, such as television receivers (e.g., set top boxes) that need to be connected with a television and/or speakers, desktop computers, and streaming device (e.g., AirTVR® Mini, Amazon® Fire Stick®, Google® Chromecast®, Apple® TV®, Roku® Streaking Stick®, Slingbox®, etc.). Some devices can both output media directly or indirectly via other devices (e.g., a tablet computer paired with head-phones). "Media," as used herein, can be audio-only or video with audio. Typical forms of media include music, podcasts, broadcast radio, movies, sporting events, streaming video content, broadcast television, and streaming television programming. Media output device 110 can include: processing system 111; network interface 112; tuners 113; content storage 114; speaker 115; audio output interface 116; electronic display 117; user interface 118; and volume model datastore 119.

Processing system 111 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Additionally, one or more special-purpose processors may be used that are specifically designed to execute machine learning models. Such general-purpose processors may execute special-purpose software that is stored using one or more non-transitory processor-readable mediums, such as random access memory (RAM), flash memory, a hard disk drive (HDD), or a solid state drive (SSD). Further detail regarding the processing performed using processing system 111 is provided in relation to FIG. 2.

One or more network interfaces such as network interface 112 may be present. Network interface 112 may allow for media output device 110 to communicate via one or more different types of wired and/or wireless communication protocols, such as IEEE 802.11, WiFi, and/or Ethernet. Network interface 112 may be used to access the Internet to stream media from various streaming media providers.

Tuners 113 may be present in some forms of media output devices, such as a television receiver, which may be implemented in the form of a set top box (STB). A television receiver may use one or more tuners to receive broadcast television content from a television service provider's distribution network (e.g., a satellite-based distribution network, a cable-based distribution network).

Content storage 114 may be used to store content, such as recorded content, for later output. For example, a user may record broadcast content received via a tuner of tuners 113 to content storage 114 for later playback. Content storage can use one or more non-transitory processor-readable mediums. Volume model datastore 119 may use the same or different non-transitory processor-readable mediums, further details of which are provided in relation to FIG. 2.

One or more speakers, such as speaker 115, may be present as part of media output device 110. The volume at which sound is output via speaker 115 can be controlled by user input such as via an on-screen volume control user interface or via a physical interface (e.g., buttons, capacitive sensor, control wheel). Whether on-screen or physical, such controls are referred to as user interface 118. In some embodiments, such as a television receiver, user interface 118 may be a remote control that has volume controls (e.g., volume buttons) on it. The volume can also be controlled by processing system 111 without direct user input. Additionally or alternatively, audio output device 120 may be used to output audio. Audio output device 120 may be in wireless communication (as illustrated) with audio output interface 116 or in wired communication with audio output interface 116. Audio output device 120 may be headphones, earbuds, or one or more remote speakers. The volume at which audio is output by audio output device 120 may be controllable by media output device 110, such as based on the amplitude of analog signal sent to audio output device 120 (e.g., for wired speakers) or based on the information included in digital signals sent wirelessly or via a wired connection to audio output device 120. Audio output device 120 may additionally have audio volume controls which can be manually adjusted by a user. In some embodiments, indications of these adjustments are transmitted back to media output device 110. In other embodiments, these volume adjustments only affect the volume of sound output.

Audio output interface 116 may be a wireless interface, such as a Bluetooth® or Bluetooth® Low Energy (BLE) interface, which allows digital data to be output to audio output device 120. Audio output interface 116 may alternatively be an analog amplifier that outputs an analog electrical signal via wire to audio output device 120, such as for wired headphones or speakers.

Electronic display 117 may be an LCD, LED, or other form of display that allows for navigation of audio content and/or output of video content. Electronic display 117 may be a touchscreen display. In some embodiments, media output device 110 does not have electronic display 117, such as an STB, but rather interfaces with an external electronic display, such as a television or monitor.

Figure 2:
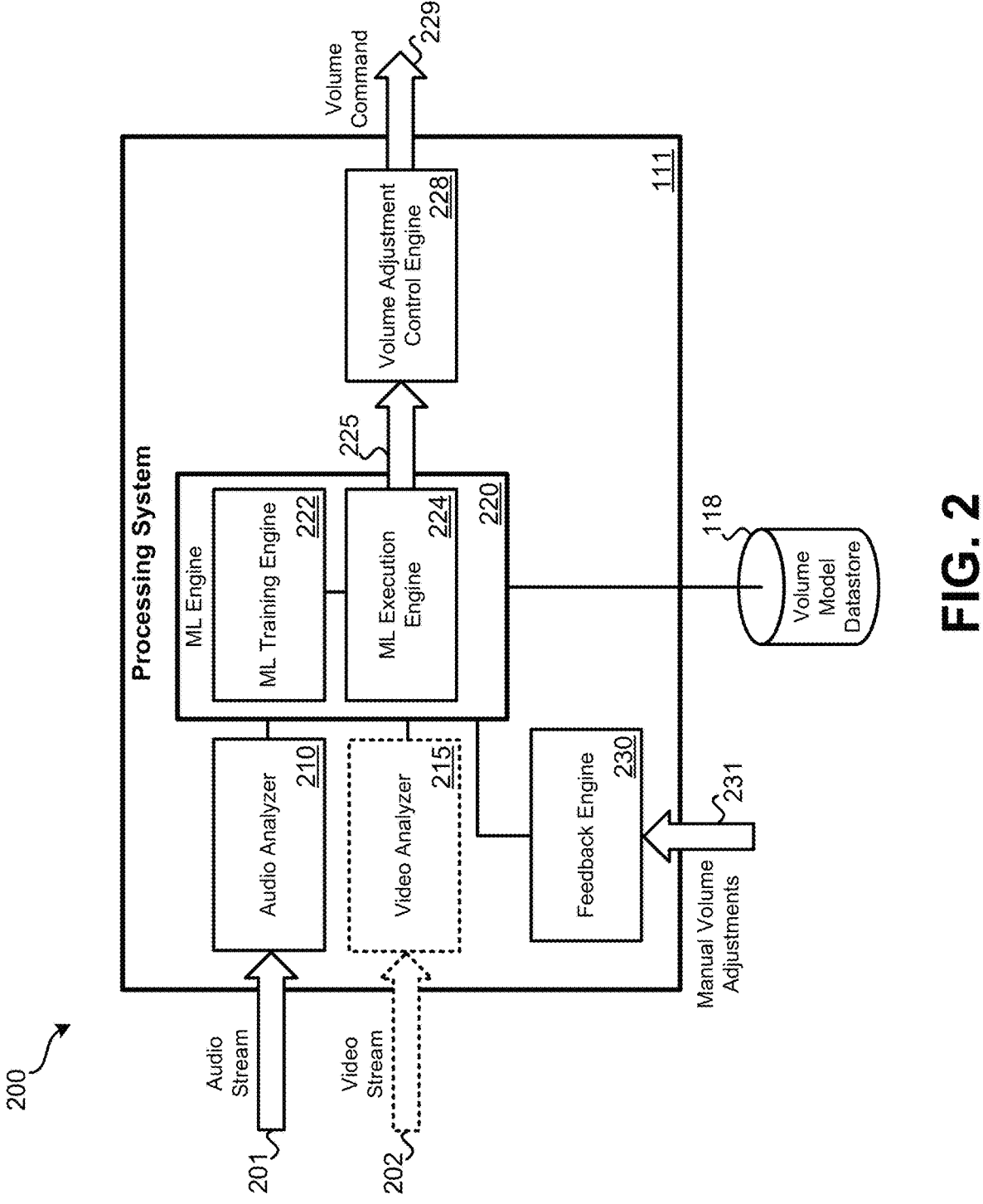
FIG. 2 illustrates an embodiment of a machine-learning based adaptive volume control system.

FIG. 2 illustrates an embodiment of a machine-learning based adaptive volume control system 200 ("system 200"). System 200 can be implemented using processing system 111 of system 100 or some other implementation of a processing system. System 200 can include: audio analyzer 210; video analyzer 215; ML engine 220; feedback engine 230; and volume model datastore 119.

Audio analyzer 210 can receive audio stream 201. Audio stream 201 may be received obtained from some form of content, whether that content be audio only or video and audio. Audio analyzer 210 may perform some level of processing or analysis on audio stream 201. In some embodiments, audio analyzer 210 may produce an audio spectrogram or may perform audio fingerprinting. Such analysis may be performed continuously, occasionally, or periodically. For example, an audio spectrogram or an audio fingerprint may be produced for 5 second chunks of audio stream every 30 seconds. The output of audio analyzer 210 may be fed to ML engine 220. In other embodiments, audio stream 201 may be fed directly to ML engine 220 without any pre-processing being performed by audio analyzer 210.

ML engine 220 may perform two fundamental tasks: learning a user's audio volume preferences; and once the user's audio volume preferences have been learned, controlling the volume of audio of content output. ML engine 220 may have at least two inputs: manual volume adjustments 231 received via feedback engine 230 and either analyzed or unanalyzed audio stream 201 (collectively referred to as "ML input audio stream").

ML engine 220 can include ML training engine 222, which is used to create a machine learning model, and ML execution engine 224, which is used to apply the ML model to perform volume adjustments. ML training engine 222 may monitor the ML input audio stream in combination with manual volume adjustments 231. Each manual volume adjustment may be mapped to a location in the ML input audio stream. In some embodiments, a delay is assumed to be present between an auditory event triggering a user to want to adjust the volume and the user actually providing a command to lower the volume. It may be assumed that some amount of time, such as between 1-10 seconds elapses between the auditory change and the user's command being provided.

To create the ML model, ML training engine 222 may use manual volume adjustments 231 as the ground-truth for creating a training data set. The training data set may include a chunk of data from the ML input audio stream mapped to the corresponding received manual volume adjustment. A manual volume adjustment may be understood as a vector having a direction (e.g., up or down) and a magnitude (e.g., one, two, three, or more increments). After a period of time, which may be between several minutes to several hours of content output (which can be across multiple content output sessions), a training data set can be created that includes a large set of data from the ML input audio stream mapped to vectors of the manual volume adjustments. The training data set can also include data from the ML input audio stream that did not trigger the user to provide a manual volume adjustment. Once a sufficiently sized training data set has been collected by ML training engine 222, a ML model may be trained via supervised learning based on the training data set. The ML model created may be a neural network, such as a three-layer neural network that has an input layer, an output layer, and a single hidden layer. In other embodiments, a greater number of hidden layers may be present. The created ML model may be a multiclass classification based ML model. That is, the ML model, based on the single input of the ML input audio stream, can classify into various classes, such as: no volume adjustment should be made; whether the volume should be adjusted up one increment; whether the volume should be adjusted down one increment; whether the volume should be adjusted up two increments; whether the volume should be adjusted down two increments, etc. While a neural network may be used as the form for the ML model, other forms are possible, including: logistic regression, Naïve Bayes, stochastic gradient descent, K-nearest neighbors, decision trees, random forest, and support vector machines.

Whichever the type of classification algorithm used, ML execution engine 224 may execute the ML model and receive the ML input audio stream as an input (possibly the only input). ML execution engine 224 may apply the trained ML model to obtain an output. The output can be volume adjustment vector 225, which indicates a direction (i.e., up or down) and a magnitude (e.g., a number of adjustment increments). For significant stretches of time, the output may be a volume adjustment vector of zero (or null or some equivalent thereof), meaning the volume should not be adjusted up or down.

When a non-zero volume adjustment vector is created, one or more conditions may need to be additionally met prior to volume adjustment vector 225 being applied to control the output volume. Volume adjustment control engine 228 may perform such functions. Volume adjustment control engine 228 can enforce: a minimum volume setting; a maximum volume setting; and a maximum rate of adjustment. The minimum volume setting, which may have a default value and may be adjustable by a user, may set a minimum volume output level which cannot be lowered beneath by volume adjustment vector 225. Similarly, the maximum volume setting, which may have a default value and may be adjustable by a user, may set a maximum volume output level which cannot be exceeded by volume adjustment vector 225. The minimum and maximum volume settings may be absolute or relative to a current volume setting of media output device 110. For example, if relative, volume adjustment vector 225 may not be permitted to increase the volume more than four increments (or some other predefined or user-set value) from the manually-set volume level. The maximum rate of adjustment as controlled by volume adjustment control engine 228 may prevent the volume from being adjusted by volume adjustment vector 225 more than some predefined number of times (e.g., system or user defined) over a rolling time period. For example, no more than two volume adjustments may be permitted in a three minute window.

If after analysis by volume adjustment control engine 228, volume adjustment vector 225 qualifies for output, volume command 229 may be output based on the volume adjustment vector 225. Volume command 229 may adjust the volume used for audio output by media output device 110 via speaker 115 and/or audio output interface 116 to audio output device 120.

In some embodiments, if the content includes video, the video may be used as an input to ML engine 220 to create the ML model and as an input to ML execution engine 224 to evaluate the ML model. To be clear, in some embodiments, video is not used and video analyzed is not present. Video analyzer 215 may fingerprint video or otherwise obtain data from video stream 202, such as the rate of change of video on the screen. (Fast changes may be generally correlated with loud noises, such as explosions in movies. Video analyzer 215 may analyze the video for the presence of people, which may generally associated with dialogue. ML engine 220 may be directly received video stream 202 as an input or may receive data obtained from video stream 202 as analyzed by video analyzer 215. In such embodiments, data obtained from video stream 202 is used to create the training data set and to execute the ML model by ML execution engine 224.

In some embodiments, after a ML model has been created by ML training engine 222, the ML model is executed in the background by ML execution engine 224 such that it produces an output but does not actually control the output volume. This shadow execution is performed for a period of time to see how accurately the created volume adjustment vectors 225 created by ML execution engine 224 mirror manual volume adjustments 231 received by feedback engine 230. Once a predefined level of accuracy is achieved, shadow execution is stopped and volume adjustment vector 225 is used to control the volume output. While shadow execution is occurring, the training set of data used by ML training engine 222 may be grown and the ML model may be periodically or occasionally updated or replaced at least until the accuracy threshold is realized.

In some embodiments, a reinforcement learning training method is used. Reinforcement learning (RL) allows for ML execution engine 224 to output volume adjustment vector 225, which can then be used to issue volume command 229 and adjust the output audio volume. Initially, a default policy to control volume may be used. Over time, feedback engine 230 receives manual volume adjustments. If a manual volume adjustment is received, the RL model is "punished" and used to update the RL policy. If no manual volume adjustment is received, the RL policy is "rewarded" for changing (or not changing) the volume in a way that satisfied the user. The RL model is continuously or occasionally adjusted based on the reward/punishment scheme based on manual volume adjustments 231 as received and interpreted by feedback engine 230. Over time, as feedback that rewards and punishes the policy is received, the policy can be expected to improve and more closely mirror the user's desired adjustments.

Feedback engine 230 may aggregate multiple volume adjustments made by a user into volume adjustment vectors. For example, several manual volume adjustments in the same direction received in quick succession (e.g., within a predefined period of time of the next adjustment) may be aggregated together to create a single manual volume adjustment vector having a greater magnitude. Feedback engine 230 may adjust an output volume adjustment vector provided to ML engine 220 based on opposing feedback. For example, if two volume up adjustments are received immediately followed by a single volume down adjustment, feedback engine 230 may interpret this as a single volume up adjustment.

In some embodiments, a single ML model or a single RL policy is created and stored using volume model datastore 119. In other embodiments, multiple models are created for different situations. For example, a user may provide input requesting that a different model be created for sports than for movies. In some embodiments, by default, separate models are created based on the genre of content, such as: drama, action, sports, news, gameshows, podcast, music, etc. In some embodiments, a models may be created based on whether content is broadcast content that includes commercial breaks or streaming content that does not include commercial breaks. In some embodiments, a user may define and name multiple volume control models and indicate when such models should be active. In some embodiments, separate models may be made for different users, such as based on which user profile is active at media output device 110. In addition to storing the specific ML models or RL policies, volume model datastore 119 may store indications of minimum volume, maximum volume, and/or volume adjustment rates to be used by volume adjustment control engine 228 for each model or policy.

In some embodiments, it may be possible to have one or more additional sources of input to ML engine 220. For example, if media output device 110 has one or more microphones, the ambient level of sound can be used as an input to ML engine 220.

Figure 3:
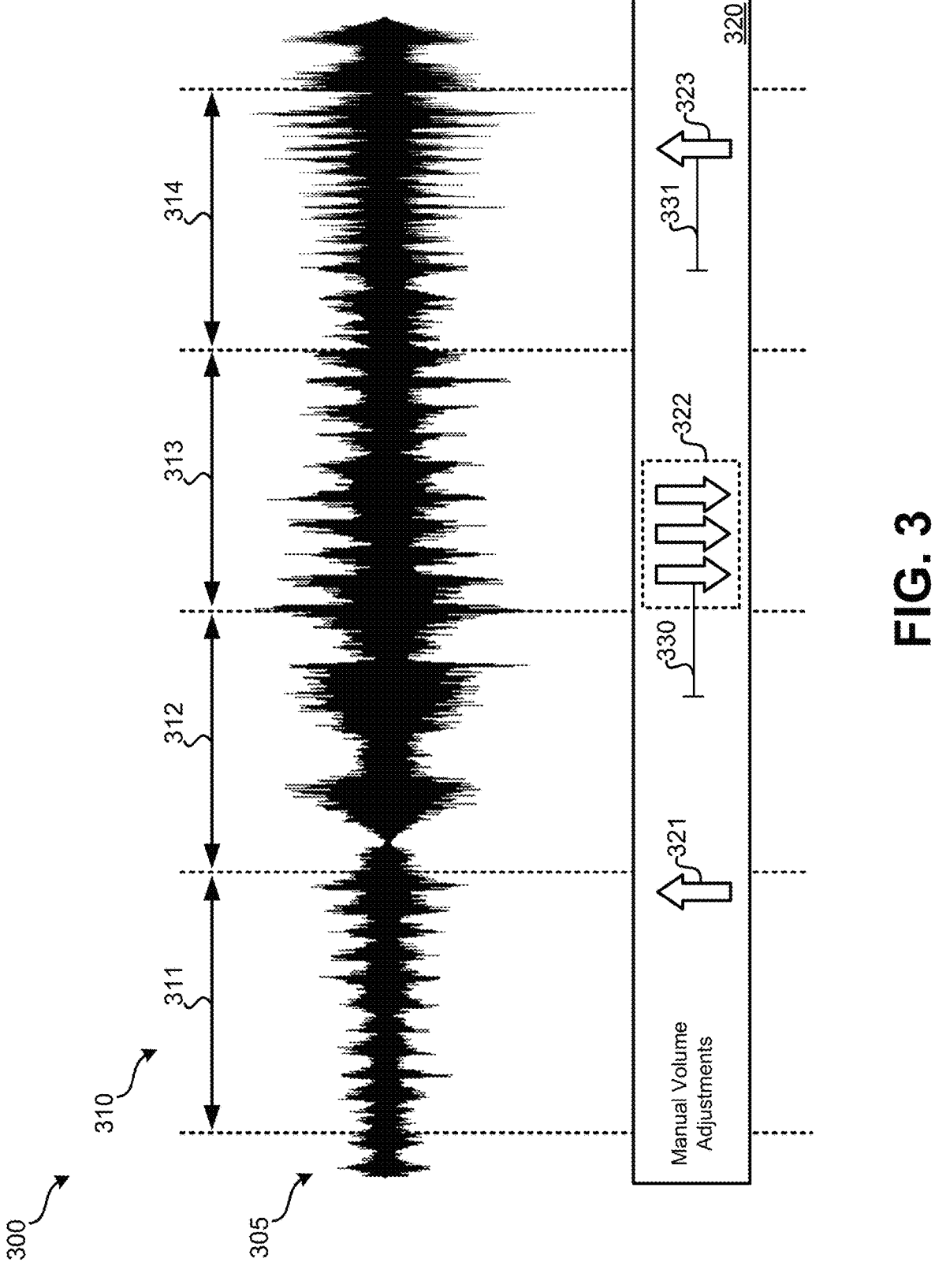
FIG. 3 illustrates an embodiment of volume adjustment events being mapped to audio characteristics of media.

FIG. 3 illustrates an embodiment 300 of volume adjustment events being mapped to audio characteristics of content as indicated on a spectrogram. Embodiment 300 can be representative of the data created and analyzed by processing system 111. In embodiment 300, audio spectrogram 305 is created by audio analyzer 210 based on audio stream 201. In some embodiments, audio spectrogram is broken up into "chunks" corresponding to a defined period of time, such as five second chunks. In other embodiments, chunks can vary in duration from one to twenty seconds. As illustrated, four chunks are present: chunk 311; chunk 312; chunk 313; and chunk 314.

For creation of a training data set by ML training engine 222, manual volume adjustments 320 may be mapped to a corresponding chunk. For example, manual volume adjustment 321 is mapped to chunk 311. Manual volume adjustment 321 may be interpreted by feedback engine 230 as a vector having a direction of up and a magnitude of one. In contrast, several repetitive volume adjustments, such as manual volume adjustment 322 may be interpreted as a vector having a direction of down and a magnitude of three. Feedback engine 230 may be configured to combine multiple repetitive manual volume adjustments into a single vector if received within a defined period of time of each other.

As previously noted, when a user provides a manual volume adjustment, the user is usually reacting to an auditory event that has occurred some amount of time in the past. Therefore, manual volume adjustments may be correlated a predefined period of time earlier with chunks of audio spectrogram 305. For example, a two second delay may be assumed. Therefore, the vector created based on manual volume adjustments 322 may be mapped to chunk 312 rather than chunk 313 as indicated by mapping 330. However, manual feedback adjustment 323 may remain mapped to chunk 314 because the two second delay remains within the time period of chunk 314 as indicated by mapping 331.

The characteristics of each of chunks 310 are mapped to either manual volume adjustments 320 or an indication that no manual volume adjustment was made. This set of training data can then be used to train an ML model or be used for RL policy adjustments.

Figure 4:
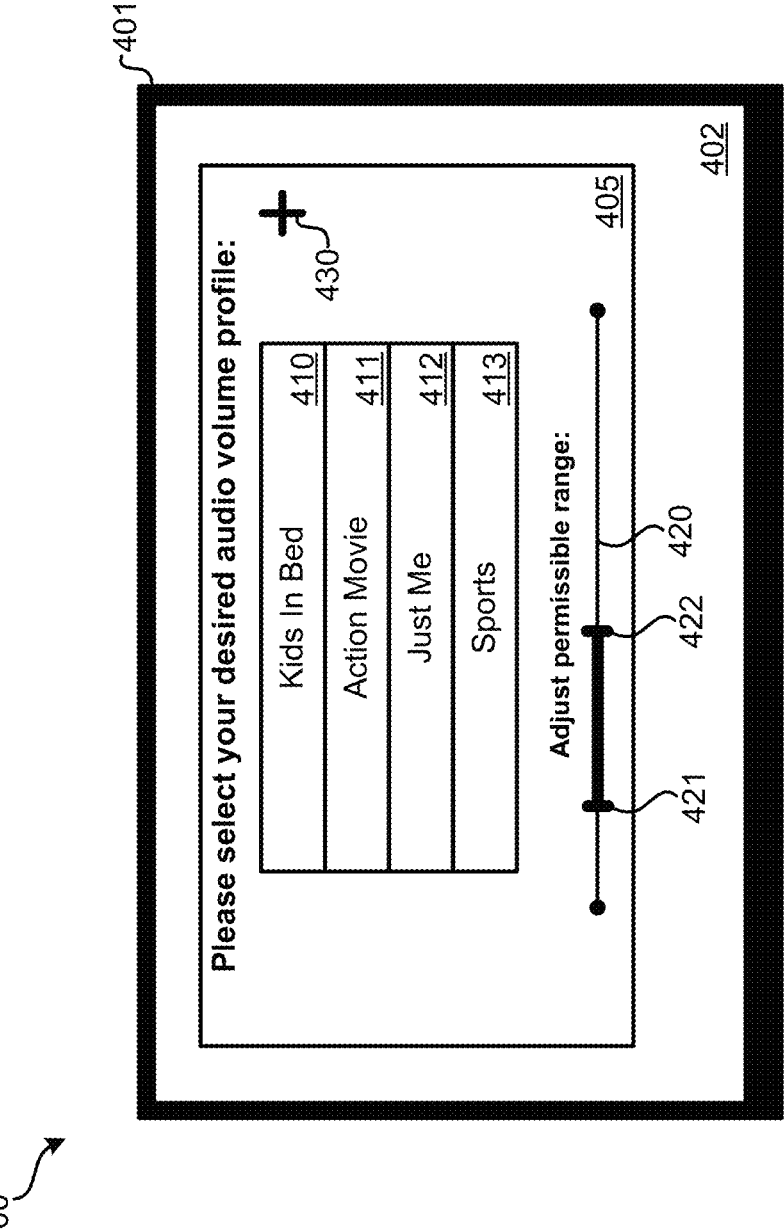
FIG. 4 illustrates an embodiment of a user interface for selecting among multiple audio profiles.

FIG. 4 illustrates an embodiment 400 of a user interface 405 presented on a television 401 over video content 402 for selecting among multiple audio profiles. User interface 405 may be output for presentation by media output device 110 to allow a user to select a particular volume model for activation and, possibly, define parameters to be used by volume adjustment control engine 228 to limit the adjustments made by ML engine 220.

In the illustrated example, a user can select from four dynamic volume control profiles: dynamic volume control profile 410; dynamic volume control profile 411; dynamic volume control profile 412; and dynamic volume control profile 413. Each of these profiles can be mapped to a separately created ML model or RL policy.

The user may further be permitted to adjust a permissible (absolute or relative) volume range 420 by altering defined minimum volume 421 and defined maximum volume 422. Issued volume commands 229 may be relative to a currently-set manual volume level. For example, on an arbitrary scale, if a user has set the output volume level to "27," the minimum volume level may be set at "−8" and the maximum volume level may be set at "+5." This means that processing system 111 can raise the volume as high as 32 and lower the volume as low as 19. If the user manually adjusts the "27" setpoint, the minimum and maximum values would be similarly adjusted. In absolute volume range embodiments, dynamic volume adjustment, including the minimums and maximums, are fixed and are unaffected by the current output volume level set by the user.

If a user desires a new dynamic volume control model to be created, the user may provide input, such as selecting new profile indicator 430. For example, a user may want different dynamic volume control profiles for different situations.

Various methods may be performed using the systems and devices detailed in relation to FIGS. 1-4. FIG. 5 illustrates an embodiment of a method 500 for performing dynamic volume control. The blocks of method 500 may be performed using a media output device, such as media output device 110 of FIG. 1. The device or system used to perform method 500 can have components, either implemented using hardware, firmware, or software, as detailed in relation to processing system 111 of FIG. 2.

At block 505, an audio stream may be received. The audio stream can be received as part of audio/video content or audio-only content. If received from a television receiver, the audio stream may be from multiple television channels as a user changes channel. More generally, regardless the type of media output device, when the user changes the content being output, the content from which the audio stream is received changes. At block 510, the audio stream may be output either directly via a speaker or indirectly via an external audio output device, such as headphones or external speakers.

At block 515, the audio stream may be analyzed as detailed in relation to audio analyzer 210 and/or ML training engine 222. While analyzing the audio stream, manual audio volume adjustments made by a user may be monitored at block 520. As detailed in relation to feedback engine 230, rapid repetitive manual volume adjustments may be aggregated into a single manual volume adjustment vector that is fed back to the ML training engine.

At block 525, the manual adjustment vectors are mapped to corresponding portions (e.g., chunks) of the analyzed audio stream. As detailed in relation to FIG. 3, in some embodiments a delay between receiving the manual volume adjustments and the analyzed audio stream is factored in, such as using a predefined fixed value between one and ten seconds. This mapping also includes instances of no manual adjustment being mapped to data from the analyzed audio stream. The resulting data set that maps audio stream data to manual volume adjustment vectors can be used as a ML training data set.

At block 530, a ML model is trained using the ML training data set. The created ML model may be a multi-layer neural network or some other type of ML model. In a RL arrangement, rather than creating an ML model, a base policy may be modified based on reward/punishment feedback received in the form of manual audio volume adjustments to obtain a customized policy to use for dynamic volume control. As previously detailed, the ML model may have one or more additional inputs, such as a video stream, level of ambient sound, or both.

Once the ML model has been created, at block 535, possibly following enablement by a user, the ML model can be used to dynamically adjust the output audio volume based on at least characteristics of the audio stream. In some embodiments, additional inputs may be used to the ML model as previously detailed. The audio volume setting may additionally be controlled using various defined minimum, maximum, or rate limits. As previously detailed, in some circumstances, block 535 may only be performed once shadow execution of the ML model achieves at least a predefined level of accuracy in predicting the user's desired volume adjustments.

At block 540, the content is output using the volume setting as adjusted at block 535. The adjusted volume setting may have been adjusted in an absolute manner or relative. If relative, the adjustments can be made starting from a last-set manual volume setting. If absolute, the model does not use the last-set manual volume setting as a reference point. Output can involve outputting the audio via a speaker or electronically to a separate device or external speakers.

At block 545, if manual volume adjustments are received, the training data set can be updated and the ML model can be periodically or occasionally updated. If a RL arrangement is used, the punishment feedback can be used to update the RL policy.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing dynamic volume control, the method comprising:
   selecting, by a media output device, a volume control profile from a plurality of volume control profiles;
   receiving, by the media output device, content comprising audio content;
   outputting, by the media output device, the audio content;
   analyzing, by the media output device, audio characteristics of the content being output;
   monitoring, by the media output device, adjustments made to an audio volume setting by a user while the audio content is being output and the selected volume control profile is active;
   mapping, by the media output device, the adjustments made to the audio volume setting by the user with the audio characteristics of the audio content in the selected volume control profile;
   adjusting, by the media output device, the audio volume setting based on the selected volume control profile; and
   outputting, by the media output device, content using the adjusted audio volume setting.

2. The method for performing dynamic volume control of claim 1, further comprising:
   training, by the media output device, a machine learning model based on the adjustments made to the audio volume setting by the user that are mapped with the audio characteristics of the audio content.

3. The method for performing dynamic volume control of claim 2, wherein adjusting the audio volume setting is further based on the trained machine learning model.

4. The method for performing dynamic volume control of claim 1, wherein the volume control profile is selected by the media output device based on user input provided based on an audio volume profile user interface.

5. The method for performing dynamic volume control of claim 4, wherein the audio volume profile user interface further provides an interface to allow a minimum volume and a maximum volume to be set.

6. The method for performing dynamic volume control of claim 5, wherein adjusting the audio volume setting is further based on the minimum volume or the maximum volume.

7. The method for performing dynamic volume control of claim 3, wherein the machine learning model classifies the audio content into an audio class of a plurality of audio classes and adjusts the audio volume setting based on the audio class into which the audio content is classified.

8. The method for performing dynamic volume control of claim 3, wherein the machine learning model is a neural network.

9. The method for performing dynamic volume control of claim 3, further comprising:
   outputting, by the media output device, video content, wherein the content comprises the video content; and
   analyzing, by the media output device, video characteristics of the video content being output, wherein the machine learning model is further trained based on the video characteristics.

10. The method for performing dynamic volume control of claim 1, where the audio volume setting is adjusted relatively based on a previous audio volume setting.

11. The method for performing dynamic volume control of claim 1, wherein the media output device is a television receiver comprising a plurality of tuners that are configured to receive broadcast television channels.

12. A media output device, comprising:
   an interface through which media comprising audio content is received;
   an audio output component through which the audio content is output to a user;
   a processing system, comprising one or more processors, the processing system configured to:
      select a volume control profile from a plurality of volume control profiles;
      receive content comprising audio content;
      output the audio content;
      analyze audio characteristics of the content being output to the user;
      monitor adjustments made to an audio volume setting by the user while the audio content is being output to the user and the selected volume control profile is active;
      map the adjustments made to the audio volume setting by the user with the audio characteristics of the audio content in the selected volume control profile;
      adjust the audio volume setting based on the selected profile; and
      output content using the adjusted audio volume setting.

13. The media output device of claim 12, wherein the processing system is further configured to:
   train a machine learning model based on the adjustments made to the audio volume setting by the user that are mapped with the audio characteristics of the audio content.

14. The media output device of claim 13, wherein adjusting the audio volume setting is further based on the trained machine learning model.

15. The media output device of claim 12, wherein the volume control profile is selected based on user input provided via an audio volume profile user interface.

16. The media output device of claim 15, wherein the audio volume profile user interface further provides for a minimum volume and a maximum volume to be set.

17. The media output device of claim 16, wherein adjusting the audio volume setting is further based on the minimum volume or the maximum volume.

18. The media output device of claim 14, wherein the processing system is further configured to:

output video content to a presentation device, wherein the content comprises the video content; and analyze video characteristics of the video content being output, wherein the machine learning model is further trained based on the video characteristics.

19. The media output device of claim 12, wherein the media output device is a television receiver comprising a plurality of tuners that are configured to receive broadcast television channels.

20. A non-transitory processor-readable medium comprising processor-readable instructions configured to cause one or more processors to:

select a volume control profile from a plurality of volume control profiles;

receive content comprising audio content;

output, to a user, the audio content;

analyze audio characteristics of the content being output to the user;

monitor adjustments made to an audio volume setting by the user while the audio content is being output to the user and the selected volume control profile is active;

map the adjustments made to the audio volume setting by the user with the audio characteristics of the audio content in the selected volume control profile;

adjust the audio volume setting based on the selected profile; and output content using the adjusted audio volume setting.

\* \* \* \* \*